US012369699B2

(12) United States Patent
Sakai

(10) Patent No.: US 12,369,699 B2
(45) Date of Patent: Jul. 29, 2025

(54) COSMETIC APPLICATOR

(71) Applicant: MITSUBISHI PENCIL COMPANY, LIMITED, Tokyo (JP)

(72) Inventor: Shunsuke Sakai, Fujioka (JP)

(73) Assignee: MITSUBISHI PENCIL COMPANY, LIMITED, Tokyo (JP)

(*) Notice: Subject to any disclaimer, the term of this patent is extended or adjusted under 35 U.S.C. 154(b) by 0 days.

(21) Appl. No.: 18/730,766

(22) PCT Filed: Jan. 24, 2023

(86) PCT No.: PCT/JP2023/002036
§ 371 (c)(1),
(2) Date: Jul. 20, 2024

(87) PCT Pub. No.: WO2023/145713
PCT Pub. Date: Aug. 3, 2023

(65) Prior Publication Data

US 2025/0113908 A1 Apr. 10, 2025

(30) Foreign Application Priority Data

Jan. 26, 2022 (JP) ................................ 2022-009979

(51) Int. Cl.
*A45D 34/04* (2006.01)
*A46B 9/02* (2006.01)
(Continued)

(52) U.S. Cl.
CPC ............ *A45D 34/042* (2013.01); *A46B 9/021* (2013.01); *A46B 9/026* (2013.01); *A46B 11/001* (2013.01);
(Continued)

(58) Field of Classification Search
CPC ...... A45D 34/042; A46B 9/021; A46B 9/026; A46B 11/001; A46B 2200/1046;
(Continued)

(56) References Cited

U.S. PATENT DOCUMENTS 11,084,316 B2 8/2021 Maruyama
11,707,127 B2 7/2023 Hattori
(Continued)

FOREIGN PATENT DOCUMENTS

JP 2005-254549 A 9/2005
JP 2008-055742 A 3/2008
(Continued)

OTHER PUBLICATIONS

International Search Report for corresponding International Application No. PCT/JP2023/002036, issued Apr. 4, 2023, with English translation.

*Primary Examiner* — David J Walczak
(74) *Attorney, Agent, or Firm* — Renner, Otto, Boisselle & Sklar, LLP

(57) ABSTRACT

A cosmetic applicator capable of stably applying a cosmetic even when the cosmetic contains large particles. A cosmetic applicator includes a barrel, a brush made of bundled fibers and provided in front of the barrel, a cosmetic accommodation portion arranged in a space behind the barrel, a guide that guides a cosmetic from the cosmetic accommodation portion to the brush, a collector that has a comb-shaped outer circumferential surface and that is disposed inside the barrel and at an outer circumferential portion of the guide, and a front barrel supporting the brush at a front portion of the barrel. A capillary force of the guide is 50 to 200 (mm) (as measured using purified water in an environment of 25° C.). (B)/(A) is 0.8 or greater, where (A) (mg) is an amount of
(Continued)

cosmetic liquid discharged for 1 (m), and (B) (mg) is an amount of cosmetic liquid discharged for 1 (m) after 30 (m).

4 Claims, 6 Drawing Sheets

(51) Int. Cl.
*A46B 11/00* (2006.01)
*B43K 5/18* (2006.01)
*B43K 8/02* (2006.01)
*B43K 8/04* (2006.01)
*B43K 8/08* (2006.01)

(52) U.S. Cl.
CPC ................ *B43K 8/022* (2013.01); *B43K 8/08* (2013.01); *A46B 2200/1046* (2013.01); *B43K 5/18* (2013.01); *B43K 8/04* (2013.01)

(58) Field of Classification Search
CPC . B43K 8/022; B43K 8/08; B43K 5/18; B43K 5/1809; B43K 7/10; B43K 8/026; B43K 8/04; B43K 8/06
USPC .................................................. 401/222–224
See application file for complete search history.

(56) References Cited

U.S. PATENT DOCUMENTS

| | | | | |
|---|---|---|---|---|
| 2003/0129015 | A1* | 7/2003 | Sexton | C09D 11/17 401/199 |
| 2005/0095055 | A1* | 5/2005 | Kwan | B43K 8/02 106/31.28 |
| 2020/0130403 | A1 | 4/2020 | Maruyama | |
| 2022/0346525 | A1 | 11/2022 | Hattori | |

FOREIGN PATENT DOCUMENTS

| | | | |
|---|---|---|---|
| JP | 2018-192242 | A | 12/2018 |
| JP | 2018-192673 | A | 12/2018 |
| JP | 2018-192794 | A | 12/2018 |
| JP | 2021-112692 | A | 8/2021 |
| WO | 2020/116604 | A1 | 6/2020 |

* cited by examiner

Fig.3E
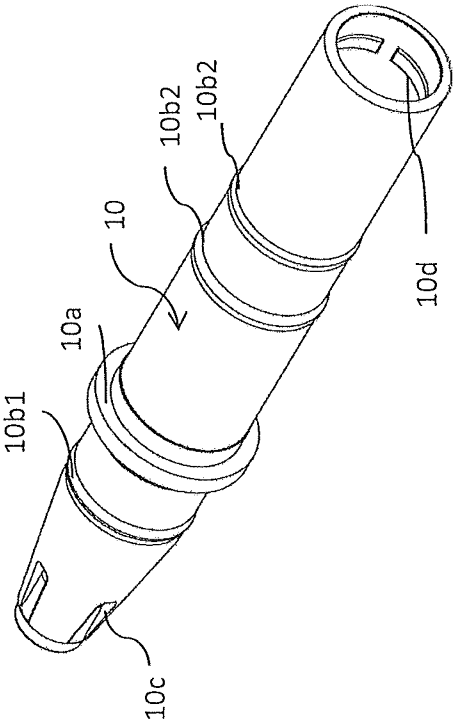
Fig.3F
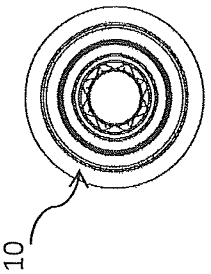
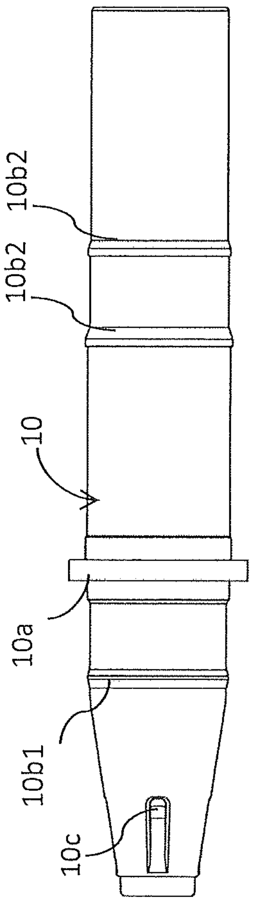
Fig.3C
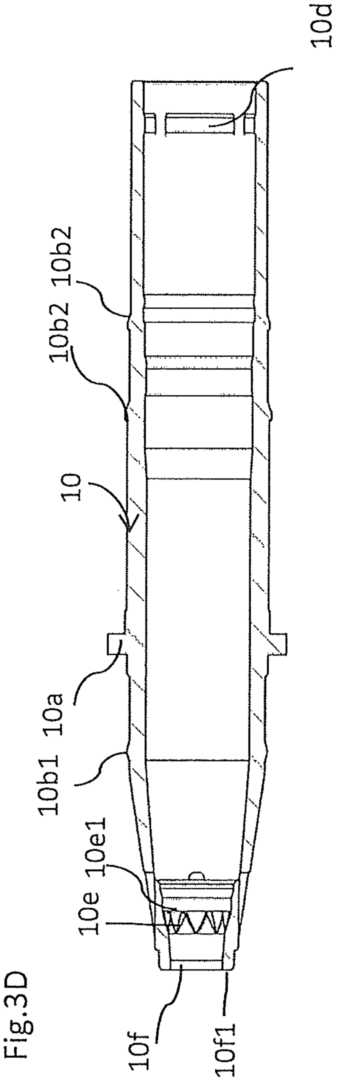
Fig.3D
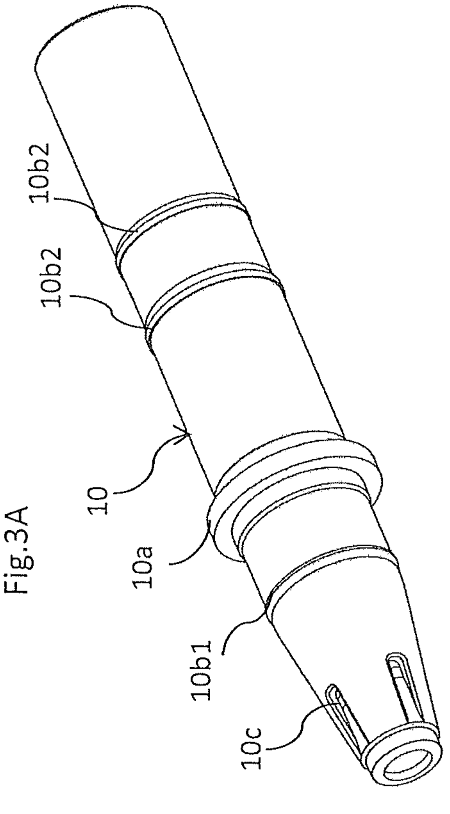
Fig.3A
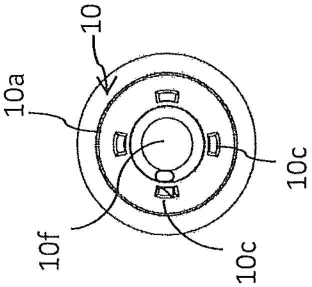
Fig.3B

| | Guide a | Guide b | Guide c | Guide d | Guide e |
|---|---|---|---|---|---|
| Outer Diameter(mm) | Φ1. 8 | Φ1. 5 | Φ2. 04 | Φ1. 8 | Φ1. 5 |
| Image Taken Of Radial Cross Section |  |  |  |  |  |
| Average Capillary Force (mm) | 94 | 113 | 199 | 218 | 454 |
| Opening Area Ratio | 38% | 34% | — | — | — |
| Porosity | — | — | 61% | 74% | 48% |

COSMETIC APPLICATOR

TECHNICAL FIELD

This disclosure relates to a cosmetic applicator for applying a cosmetic.

BACKGROUND ART

In the related art, Patent Documents 1 and 2 disclose an applicator having a front barrel with an application body protruding from the front end. The front barrel is provided with a comb-shaped collector that temporarily stores an application liquid such as a cosmetic to be supplied to the application body. An application liquid tank is attached to the front barrel from the rear, thus allowing the application liquid in the application liquid tank to flow to the collector and the application body.

Further, Patent Document 3 discloses a collector-type applicator using a color material containing tabular pigments with an average particle size of 5 to 100 μm. In this applicator, the brush of the application portion is a thin brush.

CITATION LIST

Patent Document

Patent Document 1: JP 2018-192242 A
Patent Document 2: JP 2018-192673 A
Patent Document 3: JP 2018-192794 A

SUMMARY OF INVENTION

Technical Problem

However, in the known applicators of Patent Document 1 and Patent Document 2, clogging occurs inside the brush when certain cosmetics (glitter type) are used.

Also in Patent Document 3, since the brush is thin, clogging occurs easily with certain cosmetics.

In view of such circumstances, the present disclosure provides a cosmetic applicator capable of stably applying a cosmetic even when the cosmetic contains large particles.

Solution to Problem

An embodiment of the present disclosure is a cosmetic applicator including a barrel, a brush made of bundled fibers and provided in front of the barrel, a cosmetic accommodation portion arranged in a space behind the barrel, a guide configured to guide a cosmetic from the cosmetic accommodation portion to the brush, a collector that has a comb-shaped outer circumferential surface and that is disposed inside the barrel and at an outer circumferential portion of the guide, and a front barrel supporting the brush at a front portion of the barrel, a capillary force of the guide being 50 to 200 (mm) (as measured using purified water in an environment of 25° C.), and (B)/(A) being 0.8 or greater, where (A) (mg) is an amount of cosmetic liquid discharged for 1 (m), and (B) (mg) is an amount of cosmetic liquid discharged for 1 (m) after 30 (m).

In an embodiment of the present disclosure, a maximum diameter of the brush excluding a flange portion is preferably 2.5 to 4 (mm), a ratio of a length (L1) of the brush protruding from the front barrel toward a front direction to a total length (L) of the brush, or L1/L, is preferably 0.6 to 0.9, and the total length (L) of the brush is preferably 15 (mm) or less.

In an embodiment of the present disclosure, a front end surface of the guide is preferably positioned in front of a front end surface of the front barrel, and a cross-sectional area of a space inside the brush is preferably 15(%) or greater of a cross-sectional area of the brush.

In an embodiment of the present disclosure, the cosmetic is preferably a combination of glitter particles having a long axis length of 10 to 30 (μm) and glitter particles having a long axis length of 50 to 80 (μm). Further, the cosmetic is preferably a liquid cosmetic having a viscosity of less than 25 (mPa·s). Note that the viscosity is a value measured at a temperature of 25° C. at a predetermined shear rate (100 rpm: 383 $S^{-1}$) using a cone-plate type viscometer (ELD type viscometer among TV-30 type viscometers, standard cone-plate, available from Tokimec Co., Ltd.).

Advantageous Effects of Invention

The cosmetic applicator according to an embodiment of the present disclosure can exhibit an excellent effect of stably applying a cosmetic even when the cosmetic contains large particles.

BRIEF DESCRIPTION OF DRAWINGS

FIG. 1A and FIG. 1B are an explanatory diagram of a cosmetic applicator according to an embodiment of the present disclosure with a cap on, in which FIG. 1A is an overall side view and FIG. 1B is an overall vertical cross-sectional view.

FIG. 2A, FIG. 2B, and FIG. 2C are an explanatory diagram of the same cosmetic applicator with the cap removed, in which FIG. 2A is an overall side view, FIG. 2B is an overall vertical cross-sectional view, and FIG. 2C is a detailed cross-sectional view of an area around a brush at a front portion of a front barrel.

FIG. 3A, FIG. 3B, FIG. 3C, FIG. 3D, FIG. 3E and FIG. 3F are a component view of the front barrel, in which FIG. 3A is a perspective view from the front, FIG. 3B is a front view, FIG. 3C is a side view, FIG. 3D is a vertical cross-sectional view, FIG. 3E is a perspective view from the rear, and FIG. 3F is a rear view.

FIG. 4A, FIG. 4B, FIG. 4C, and FIG. 4D are a component diagram of a guide, in which FIG. 4A is a front view, FIG. 4B is a perspective view, FIG. 4C is a side view, and FIG. 4D is an enlarged front view.

DESCRIPTION OF EMBODIMENTS

Embodiments of the present disclosure will be described below with reference to drawings.

Figure 1A:
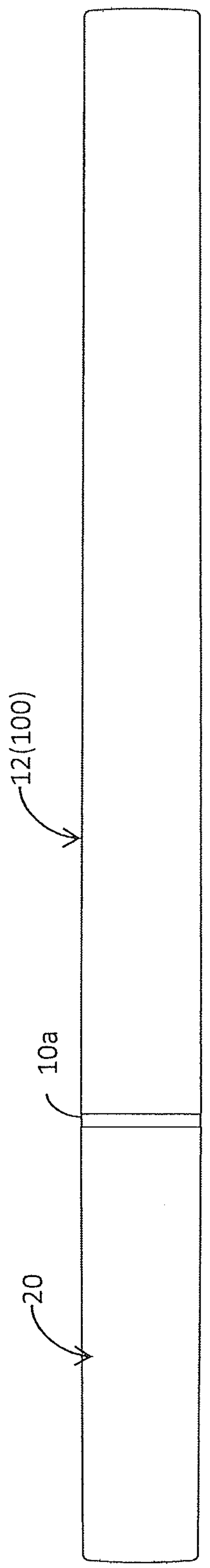
Figure 1B:
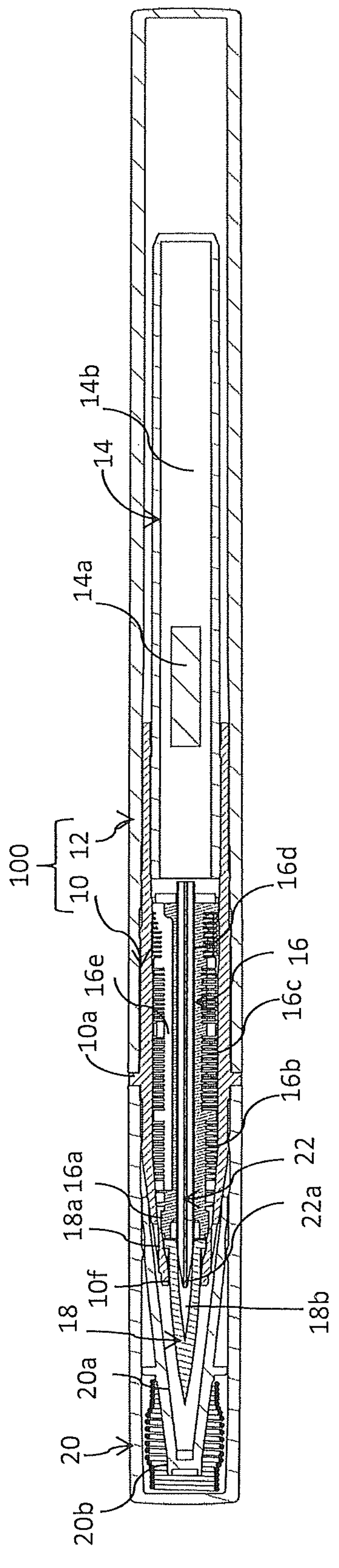
Figure 2A:
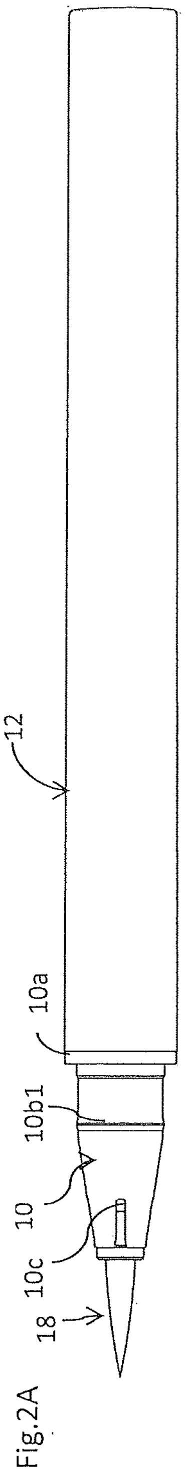
Figure 2B:
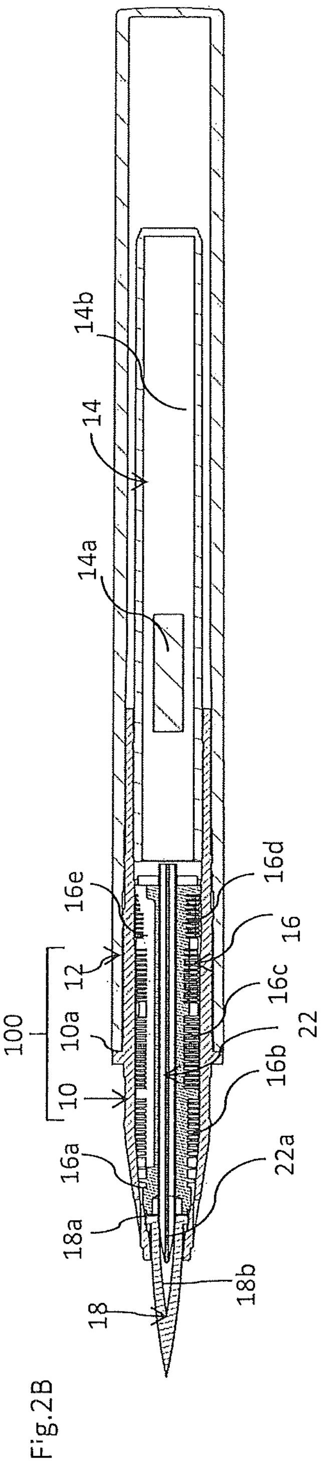
Figure 2C:
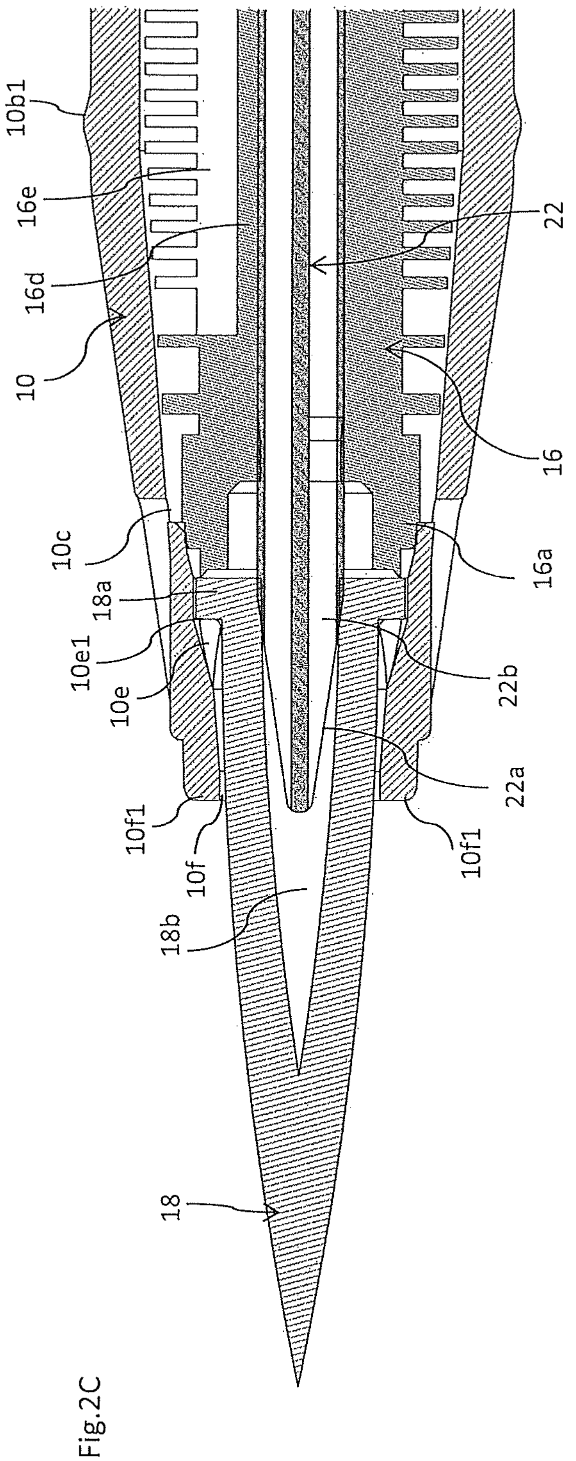
Figure 4A:
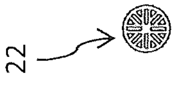
Figure 4B:
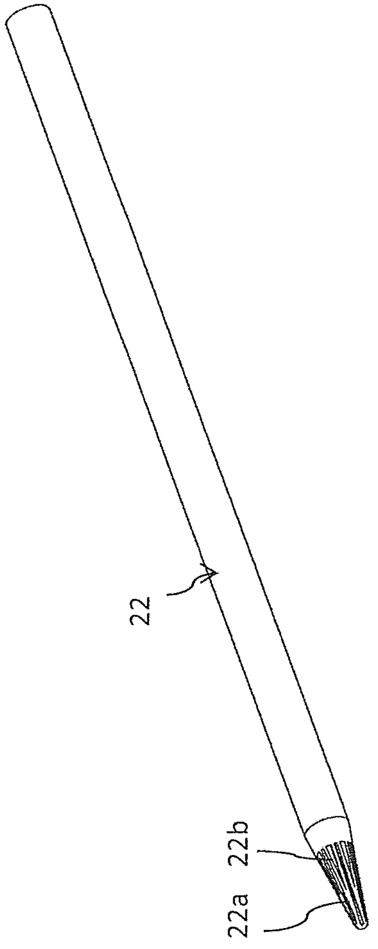
Figure 4C:
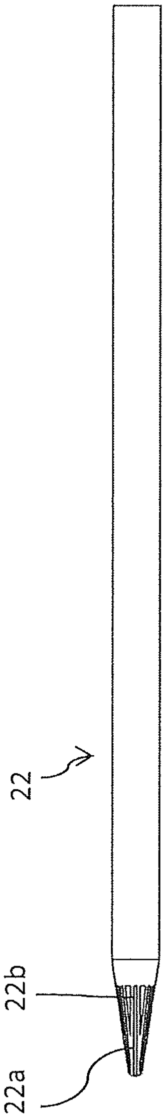
Figure 4D:
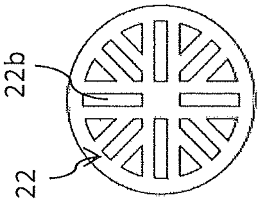

FIG. 1A and FIG. 1B are an overall explanatory diagram of a cosmetic applicator according to an embodiment of the present disclosure, and FIG. 2A, FIG. 2B, and FIG. 2C are an explanatory diagram of the cosmetic applicator with a cap removed.

As illustrated in FIG. 1A, FIG. 1B, FIG. 2A, FIG. 2B, and FIG. 2C, the cosmetic applicator includes a barrel 100 composed of a front barrel 10 and an outer barrel 12, a brush (application body) 18 made of bundled fibers and provided in front of the barrel 100, a cosmetic accommodation portion 14 arranged in a space inside the outer barrel 12 in a portion behind the front barrel 10, a guide 22 configured to guide a cosmetic from the cosmetic accommodation portion 14 to the brush 18, a collector 16 that has a comb-shaped outer circumferential surface and that is disposed inside the barrel 100 and at an outer circumferential portion of the guide 22, and a front barrel 10 supporting the brush 18 at a front portion of the barrel 100, a capillary force of the guide 22 being 50 to 200 (mm) (as measured using purified water in an environment of 25° C.), and [B]/[A] being 0.8 or greater, where (A) (mg) is an amount of cosmetic liquid discharged for 1 (m), and [B] (mg) is an amount of cosmetic liquid discharged for 1 (m) after 30 (m).

The barrel 100 has a structure in which the outer barrel 12 is fitted to the outer circumference of the rear side of the front barrel 10, and a collector 16 containing a plurality of lamella portions arranged in the axial direction to form a comb shape is disposed inside the front barrel 10.

Further, in the cosmetic applicator, a rear portion of the brush 18 is arranged inside the front barrel 10, and a front portion of the brush 18 is arranged to protrude from a front end opening 10*f* of the front barrel 10.

The cosmetic accommodation portion 14 that accommodates a cosmetic is detachably installed in the outer barrel 12, as an inner barrel.

The cosmetic accommodation portion 14 is fitted into a rear portion of the front barrel 10 and communicates with a rear portion of the collector 16. The cosmetic accommodation portion 14 that accommodates a cosmetic is independent from the outer barrel 12, forming a tube-in-tube structure, and the cosmetic applicator is a collector type cosmetic applicator.

Here, when the cosmetic applicator is not being used, as illustrated in FIG. 1A and FIG. 1B, a cap 20 is externally fitted to the front portion of the front barrel 10 to prevent the brush 18 from drying out, whereas when the cosmetic applicator is being used, the cap 20 is removed to expose the brush 18.

Outer Barrel 12

The outer barrel 12 has a tubular shape with a closed tail end. The cosmetic accommodation portion 14 is provided inside a space of the outer barrel 12 defined by the closed tail end, the rear portion of the front barrel 10, and the rear end of the collector 16.

Cosmetic Accommodation Portion 14

An impregnation body such as an absorbent core is not disposed inside the cosmetic accommodation portion 14. Instead, a liquid cosmetic is directly accommodated in the cosmetic accommodation portion 14 (free ink type), and a stirrer 14*a* for stirring the application liquid is disposed in the cosmetic accommodation portion 14.

The collector 16 is a covered structure that is positioned inside the front barrel 10 and behind the brush.

The front barrel 10, the outer barrel 12, the cosmetic accommodation portion 14, the collector 16, the cap 20, and the like may be resin molded products. Further, the stirrer 14*a* may be a cylindrical material made of metal or resin. The stirrer 14*a* is accommodated in an accommodation space 14*b* inside the accommodation portion 14.

Brush 18

The brush 18, which is made of a bundle of bristles having a tapered shape, protrudes from the opening 10*f* of a front end portion of the front barrel 10. The cap 20 covering the brush 18 is detachably fitted to the front barrel 10. The front barrel 10 has a substantially conical side shape and is tapered, and the front end angle of the front barrel 10 is preferably substantially the same angle as the front end angle of the brush 18.

A flange 18*a* is formed at a rear end portion of the brush 18 with an enlarged diameter. Inside the brush 18, there is a space 18*b* spanning from a center portion of the flange 18*a* toward a front end portion of the brush 18 up to the length of approximately ⅔ or greater of the brush 18, and a front end portion 22*a* of the guide 22 is inserted into and present in the space 18*b*.

The brush 18 is formed in a brush shape and is made of a bundle of bristles (fiber bundle) in which a large number of resin fibers or natural fiber bundles are bundled. The diameter of the rear end portion of the brush 18 is enlarged, forming a flange shape, which is the flange 18*a* containing the space 18*b* inside. The flange 18*a* having an enlarged diameter engages with a front end 10*e*1 of a rib 10*e* inside the front end portion of the front barrel 10 in a non-surface contact manner, and thus is prevented from falling out. It should be noted that the brush 18 is preferably a brush body, but other various brushes for applying the application liquid can be used.

Front Barrel 10

As illustrated in FIG. 1A and FIG. 1B to FIG. 3A, FIG. 3B, FIG. 3C, FIG. 3D, FIG. 3E and FIG. 3F, at the front of the front barrel 10, the brush 18 protrudes from the front end opening 10*f*, and the guide (relay core) 22 penetrates the collector 16 and extends up to the inside of the brush 18.

At the outer circumferential surface of the front barrel 10, a flange 10*a* is formed protruding in the outer radial. The flange 10*a* has a tapered front end portion and a center portion for positioning the cap 20 when the cap 20 is fitted. A protruding portion 10*b*1 for fitting the cap 20 is formed in front of the flange 10*a*, and two protruding portions 10*b*2 for fitting the outer barrel 12 are formed behind the flange 10*a*. In addition, air replacement holes 10*c* penetrating the circumferential surface from the inside to the outside are formed in front of the protruding portion 10*b*1 of the front barrel 10.

More specifically, as illustrated in FIG. 3A, FIG. 3B, FIG. 3C, FIG. 3D, FIG. 3E and FIG. 3F, the flange 10*a* is configured to have an enlarged diameter and is located in the vicinity of the center portion behind the air replacement holes (vent holes) 10*c* at the front end portion of the front barrel 10. A rear portion extends in a cylindrical shape from the flange 10*a*, and the protruding portions 10*b*2 are formed on the outer circumferential surface of the rear portion at a position about halfway into the rear portion from a rear end surface of the flange 10*a*. The protruding portions 10*b*2 are formed at two positions.

As illustrated in FIG. 3A, FIG. 3B, FIG. 3C, FIG. 3D, FIG. 3E and FIG. 3F, a rib-like inner protrusion 10*d* extends in the circumferential direction is arranged in the circumferential direction at the inner circumferential surface of the tubular rear end portion of the front barrel 10, and the front barrel 10 engages with the outer circumferential surface of the cosmetic accommodation portion 14 at the inner protrusion 10*d*.

As illustrated in FIG. 3A, FIG. 3B, FIG. 3C, FIG. 3D, FIG. 3E and FIG. 3F, a rib 10*e* is formed inside the front end side the front barrel 10. On the inner circumferential surface of the rear portion thereof, the rib 10*e* has a triangular top portion 10*e*1 protruding rearward. Since the brush 18 has the flange 18*a*, when the brush 18 is installed in the front barrel 10 during assembly, the top portion 10_e_1 of the rib 10_e_ comes into contact with the flange 18_a_ in a non-surface contact manner.

Cap 20

As illustrated in FIG. 1A and FIG. 1B, inside the cap 20, a cup-shaped inner cap 20_a_ that covers the brush 18 in order to enhance airtightness is arranged and is movable forward and backward, and a spring 20_b_ is arranged to urge the inner cap 20_a_ toward the rear.

Guide 22

The collector 16 having a bellows shape is disposed inside the hollow, tapered front barrel 10 behind the brush 18. The guide 22 penetrates the inside of a cylindrical portion 16_d_ of the collector 16.

As illustrated in FIG. 4A, FIG. 4B, FIG. 4C, and FIG. 4D, the guide 22 is a resin-molded core composed of a capillary member such as a resin fiber bundle, a natural fiber bundle, or a resin porous body in which a plurality of communication holes 22_b_ are radially arranged in a cross-sectional view (see FIG. 4A, FIG. 4B, FIG. 4C, and FIG. 4D). The guide 22 has the front end portion 22_a_ (front end surface) which is formed in a tapered shape, and the communication holes 22_b_ inside the guide 22 are exposed at the front end portion 22_a_. As illustrated in FIG. 2A, FIG. 2B, and FIG. 2C, the front end position of the front end portion 22_a_ substantially aligns with the position of the front end surface portion 10_f_1 of the front barrel 10.

The guide 22 does not protrude into the accommodation space 14_b_ inside the accommodation portion 14 from the rear end portion of the collector 16 (see FIG. 1A, FIG. 1B, FIG. 2A, FIG. 2B, and FIG. 2C). The rear end surface of the guide 22 substantially aligns with the rear end surface of the collector 16. By aligning the guide 22, the rear end of the guide 22 does not protrude into the accommodation space 14_b_, and the volume in the accommodation space 14_b_ can be secured. In addition, since the rear end of the guide 22 does not protrude into the accommodation space 14_b_, when the stirrer 14_a_ is provided in the accommodation space 14_b_, the stirrer 14_a_ does not collide with the guide 22 and does not cause the guide 22 to deform even when the stirrer 14_b_ moves inside the accommodation space 14_b_, thus allowing the application liquid to sufficiently penetrate.

Collector 16

As illustrated in FIG. 1A and FIG. 1B to FIG. 3A, FIG. 3B, FIG. 3C, FIG. 3D, FIG. 3E and FIG. 3F, a bowl-shaped portion 16_a_ is formed at the front end of the front portion of the collector 16 in the axial direction. In the collector 16, a front temporary storage portion 16_b_ and a rear temporary storage portion 16_c_ in which a plurality of comb-shaped fins are arranged with gaps in between are formed from the front portion to the center portion in the same axial direction. A fin for temporarily storing the application liquid is formed by the front temporary storage portion 16_b_ and the rear temporary storage portion 16_c_.

The guide 22 is inserted into the collector 16. In the embodiment, the cylindrical portion (or wall portion) 16_d_ is formed near the axial center of the collector 16, and the guide 22 passes through the center of the cylindrical portion 16_d_. At the outer circumference of the cylindrical portion 16_d_, a plurality of thin plate-shaped fins (the front temporary storage portion 16_b_ and the rear temporary storage portion 16_c_) for temporarily storing the application liquid are expanded in the outer diameter direction, forming a lamella.

In addition, in the collector 16, a longitudinal ink groove (slit) 16_e_ that guides the application liquid into the gaps between fins is formed from the front temporary storage portion 16_b_ to the rear temporary storage portion 16_c_ and is exposed at the rear end portion (allowing for exposure to the accommodation space 14_b_ of the accommodation portion 14). In addition, a thick support wall that abuts the inner surface of the front barrel 10 is provided between every several fins of the front temporary storage portion 16_b_ and the rear temporary storage portion 16_c_, appropriately partitioning the fins.

Comparison Between Embodiment of the Invention and Comparative Example

In the present embodiment, a maximum diameter of the brush 18 excluding the flange 18_a_ is 2.5 to 4 (mm), a ratio of a length (L1) of the brush protruding from the front barrel toward a front direction to a total length (L) of the brush, or L1/L, is 0.6 to 0.9, and the total length (L) of the brush is 15 (mm) or less.

In addition, in the cosmetic applicator, the front end portion 22_a_ of the guide 22 is positioned in front of the front end surface portion 10_f_1 of the front barrel 10, and a cross-sectional area of the space 18_b_ inside the brush 18 is 15(%) or greater of a cross-sectional area of the brush 18.

Figure 5A:
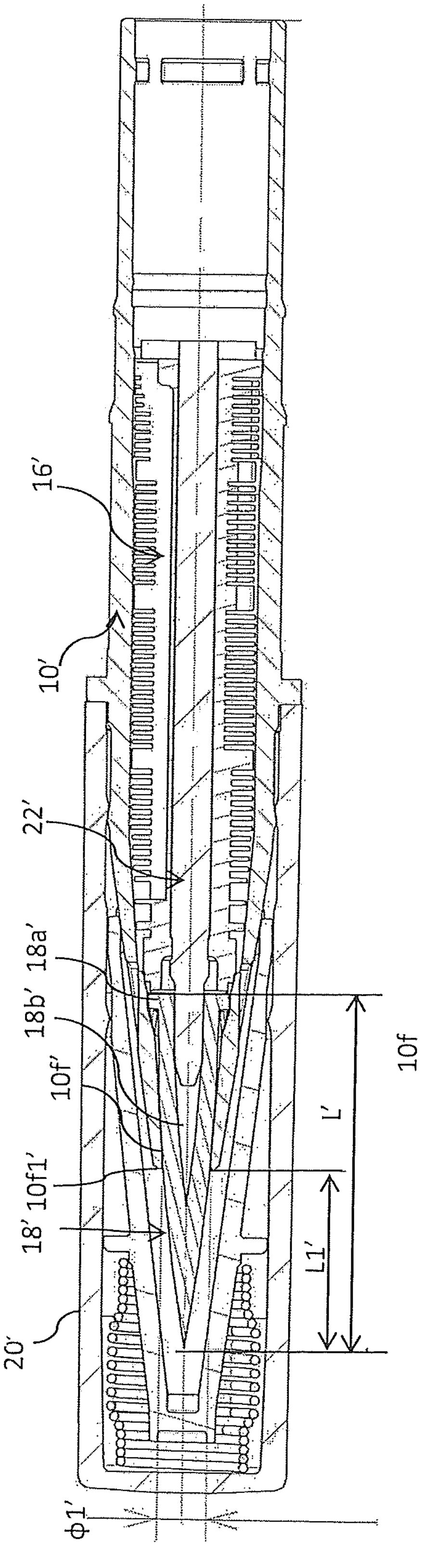
In FIG. 5A and FIG. 5B are explanatory diagrams comparing a comparative example and an example in terms of the dimensional relationship between the front barrel and the brush.
Figure 5B:
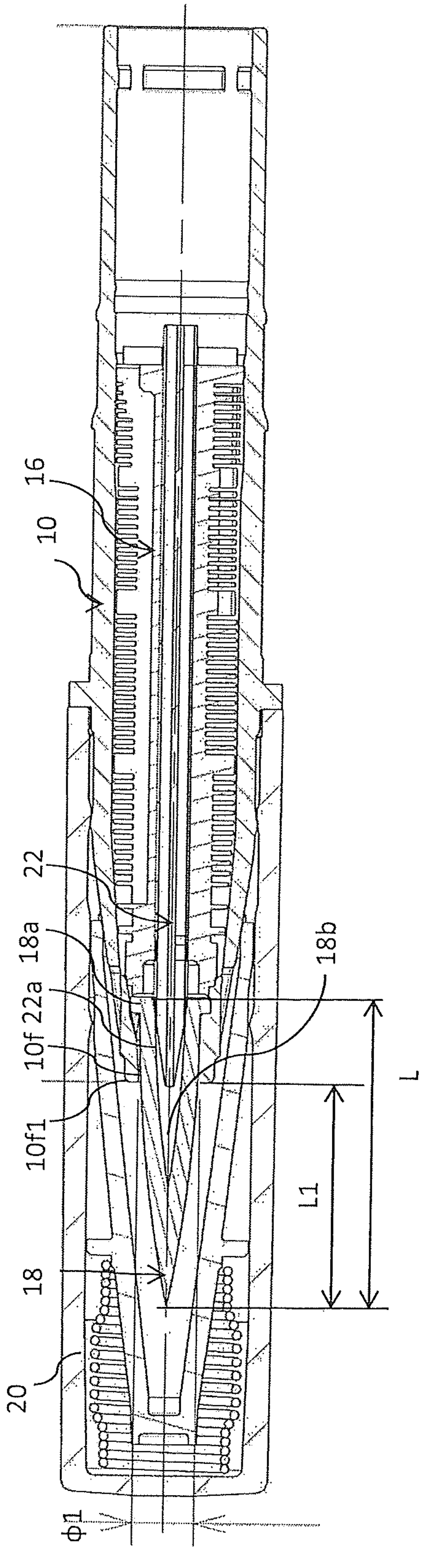

In FIG. 5A and FIG. 5B compare the sizes of cosmetic applicators of a comparative example and the embodiment. Note that, in the comparative example, components similar to those in the embodiment are distinguished by adding "'" to the same reference numerals.

As illustrated in FIG. 5A, in the cosmetic applicator of the comparative example, a brush 18' protrudes from an opening 10_f_' of a front barrel 10', and the brush 18' is covered with a cap 20' and is in a non-use state. A guide 22' is inserted through a collector 16' in the front barrel 10'.

As an example of this cosmetic applicator, a maximum diameter φ1' of the brush 18' excluding a flange 18_a_' is 2.9 (mm), a length (L1) of the brush 18' protruding from (a front end surface portion 10_f_1' of) the front barrel 10' toward the front direction is 8 (mm), a total length (L) of the brush 18' is 16 (mm), and a ratio of L1/L is 8/16 or 0.5. A space 18_b_' inside the brush 18' has a length of 5.4 (mm). The space 18_b_' inside the brush 18' has a maximum inside diameter of 1.2 (mm).

$$\text{Cross-Sectional Area } S1 \text{ of Brush } 18' = (2.9/2)\times(2.9/2)\times\pi = 2.10\pi$$

$$\text{Cross-Sectional Area } S2 \text{ of Space } 18b' \text{ Inside Brush } 18' = (1.2/2)\times(1.2/2)\times\pi = 0.36\pi$$

$$S2/S1 = 0.36\pi/2.10\pi = 0.17$$

Therefore, in the cosmetic applicator of the comparative example, the cross-sectional area of the space 18_b_' inside the brush 18' is 17(%) of the cross-sectional area of the brush 18' (−8% compared to that in the example).

In comparison, as an example of the cosmetic applicator of the embodiment illustrated in FIG. 5B, the maximum diameter φ1 excluding the flange 18_a_ of the brush 18 is 2.9 (mm), the length (L1) of the brush 18 protruding from (the front end surface portion 10_f_1 of) the front barrel 10 toward the front direction is 10 (mm), the total length (L) of the brush 18 is 14 (mm), and the ratio of L1/L is 10/14 or 0.71. The total length (L) of the brush 18 is 14 (mm), which is 15 (mm) or less. Moreover, the space 18_b_ inside the brush 18 has a length of 4.6 (mm). The space 18_b_ has a maximum inner diameter of 1.45 (mm).

$$\text{Cross-Sectional Area } S1 \text{ of Brush } 18 = (2.9/2)\times(2.9/2)\times\pi = 2.10\pi$$

$$\text{Cross-Sectional Area } S2 \text{ of Space } 18b \text{ Inside Brush } 18 = (1.45/2)\times(1.45/2)\times\pi = 0.53\pi$$

$$S2/S1 = 0.53\pi/2.10\pi = 0.25$$

Therefore, in the cosmetic applicator according to the embodiment, the cross-sectional area of the space 18*b* inside the brush 18 is 25(%) of the cross-sectional area of the brush 18, which is 15(%) or greater.

In the cosmetic applicator of the embodiment, clogging of cosmetic can be prevented by enlarging the space 18*b* inside the brush 18 (application portion) from the front end surface of the front barrel 10.

Figure 6:
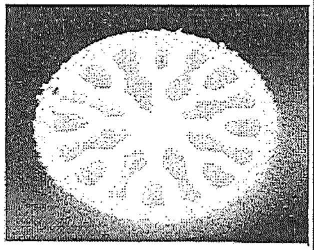
FIG. 6 is an explanatory diagram of examples and comparative examples of the guide.
Figure 6:
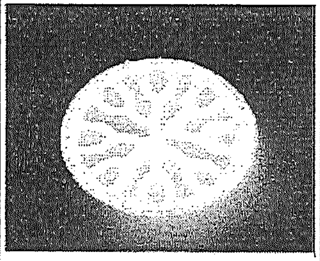
Figure 6:
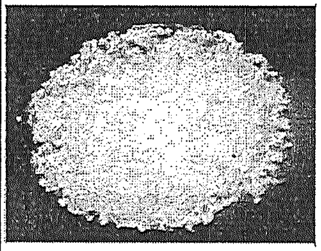
Figure 6:
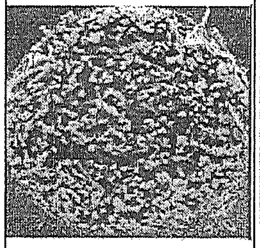
Figure 6:
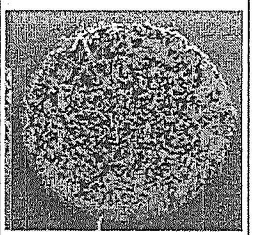

As illustrated in FIG. 6, the guide 22 was effective as presented in the example regardless of whether it was a molded core, such as guides a to c, or a fiber bundle.

Liquid Cosmetic

The guide 22 has a capillary force (as measured using purified water in an environment of 25° C.) of 50 to 200 (mm). When the amount of cosmetic liquid discharged for 1 (m) is (A) (mg) and the amount of cosmetic liquid discharged for 1 (m) after 30 (m) is (B) (mg), (B)/(A) is 0.8 or greater.

The cosmetic includes at least glitter particles having a long axis length of 10 to 30 (μm), glitter particles having a long axis length of 50 to 80 (μm), and water, and has a viscosity of less than 25 (mPa·s).

The liquid cosmetic composition in the accommodation portion 14 will be described in detail.

The glitter particles are tabular pigments whose surfaces are coated with a compound, and examples thereof include pigment flakes such as pearl pigments, aluminum flake pigments (aluminum powder pigments), metal- or metal oxide-coated glass flakes, and aluminum-coated polyester films, as well as those obtained by coating the surfaces of the tabular pigments above with compounds such as cellulose, hemicellulose, lignin, chitin, and chitosan. By combining a plurality of glitter particles, such as 0.5 to 2% of the glitter particles having a long axis length of 10 to 30 (μm) and 2 to 5% of the glitter particles having a long axis length of 50 to 80 (μm), a more vivid glitter coating film is easily obtained. When the percentage is below the numerical range above, it becomes difficult to obtain sufficient glitter during coating, and when the percentage exceeds the numerical range above, evaluation of the amount of liquid discharged becomes difficult.

In addition, an acrylic copolymer is preferably used from the viewpoint of fixing property and dispersion stability. The acrylic copolymer to be used includes, for example, at least one of an alkyl acrylate copolymer, an acrylates copolymer, an acrylates copolymer ammonium, an acrylic resin alkanolamine liquid, an alkyl acrylate-vinyl acetate copolymer, an (alkyl acrylate-octylacrylamide) copolymer, a silicone-modified acrylic copolymer, or an acrylic acid octylamide-acrylic acid copolymer.

The acrylic copolymer to be used is preferably an acrylic alkyl copolymer, an acrylates copolymer, or the like from the viewpoint of further performance and improvement of the fixing property. Examples of the alkyl acrylate copolymer include an (octylacrylamide/hydroxypropyl acrylate/butylaminoethyl methacrylate) copolymer (trade name "AMPHOMER": powder) and an alkyl acrylate copolymer ammonium (trade name "YODOSOL GH800F": solids content 45%).

Note that, for neutralization, 2-amino-2-methyl-1-propanol, 2-amino-2-methyl-1,3-propanediol, triethanolamine, L-arginine, aqueous ammonia, sodium hydroxide, or the like can be used, and 2-amino-2-methyl-1-propanol is particularly preferable.

The content of these acrylic copolymers is preferably 1 to 20% in terms of solid content based on the total amount of the composition.

When the content of the acrylic copolymer is less than 1%, it is difficult for the effects of the present invention to exhibit. Meanwhile, when the content exceeds 20%, the thickening action becomes significant, and the discharge property from the application portion and good application cannot be carried out.

In addition to the above ingredients, the remainder of the liquid cosmetic composition is prepared with water (purified water, ion-exchanged water, distilled water, pure water, or the like) serving as a solvent.

Furthermore, a humectant, an antibacterial agent, an antifoaming agent, an inorganic pigment or an organic pigment, a dye, a surfactant, a water-soluble organic solvent, and the like can be appropriately contained within a range that does not interfere with the dispersion system and does not impair the effects of the present invention.

Examples of the humectant that can be used include water-soluble glycols such as 1,3-butylene glycol, 1,4-butylene glycol, pentylene glycol, ethylene glycol, diethylene glycol, polyethylene glycol, propylene glycol, dipropylene glycol, and glycerin.

The content of these humectants is preferably used in the range of 1 to 30%, more preferably 5 to 208, with respect to the total amount of the composition.

Examples of the antibacterial agent that can be used include parabens, sodium dehydroacetate, phenoxyethanol, and the like. Note that, the antibacterial agent of the present invention includes preservatives. As parabens which are preservatives, methyl paraoxybenzoate, ethyl paraoxybenzoate, propyl paraoxybenzoate, butyl parahydroxybenzoate, isopropyl paraoxybenzoate, or the like can be used in an appropriate amount.

Examples of the antifoaming agent that can be used include polydimethylsiloxane (simethicone). This polydimethylsiloxane is a silicone oil consisting of a mixture of methylated linear siloxane polymers endblocked with trimethylsiloxy units.

The pH of the liquid cosmetic composition is preferably in the range of 6 to 9 from the viewpoint of suppressing skin irritation. Note that, the pH can be adjusted using a pH adjusting agent such as 2-amino-2-methyl-1-propanol, 2-amino-2-methyl-1,3-propanediol, triethanolamine, L-arginine, aqueous ammonia, sodium hydroxide, or a citric acid solution.

Table 1 presents an example in which the cosmetic applicator of a comparative example is compared with the cosmetic applicator of an example of the present invention in terms of the length of strokes drawn using various cosmetics accommodated in the cosmetic applicators. In this case, the comparative example and the example having the structures illustrated in In FIG. 5A and FIG. 5B were compared in terms of the distance until application became impossible when application was performed aiming for a distance of 30 (m). The measurement for evaluation of application property was as follows. A cosmetic applicator was held vertically on the surface of a sheet of paper that meets JIS P3201. The front end (application portion) of the brush was bent to apply the cosmetic liquid contained in the cosmetic applicator clockwise at an application width of 1 to 2 mm, drawing a circle having a diameter of 30 mm at a speed of 0.4 m/min. After one circle of application, manual stirring was performed five times. The application amount was measured every 5 m, and then the application performance was evaluated after 30 m. The evaluation criteria are based on the results of (B)/(A) as follows, where (A) (mg) is the amount of cosmetic liquid discharged for the first 1 (m) and (B) (mg) is the amount of cosmetic liquid discharged for 1 (m) after 30 (m). Note that in each example, the average value where n=3 was used.

Evaluation A: (B)/(A) is 0.8 or greater
Evaluation B: (B)/(A) is 0.5 or greater
Evaluation C: (B)/(A) is less than 0.5

Guide d: fiber bundle with an outer diameter φ of 1.8 (mm), a capillary force of 218 (mm), and a porosity of 74%, Guide e: fiber bundle with an outer diameter φ of 1.5 (mm), an average capillary force of 454 (mm), and a porosity of 48%

The capillary force was the average value of two measurements where n=3 in each example using purified water in an environment of a temperature of 25° C. and a humidity of 60%. The porosity was measured by immersing a guide having a known mass and apparent volume in purified water, sufficiently impregnating the guide with purified water, and then measuring the mass after taking the guide out from the purified water. From the measured mass, the volume of water impregnated in the guide was derived. Assuming that the volume of the purified water was the same as the pore volume of the guide, the porosity was calculated from the following equation. The opening area ratio was measured using an image taken of a radial cross section using an electron microscope.

TABLE 1

| Item | Reference Sign | Example 1 | Example 2 | Example 3 | Comparative Example 1 | Comparative Example 2 | Example 4 | Example 5 | Comparative Example 3 | Comparative Example 4 |
|---|---|---|---|---|---|---|---|---|---|---|
| Distance | L1 | 10 | 10 | 10 | 10 | 10 | 10 | 8.5 | 6 | 6 |
| | L | 16 | 14 | 14 | 16 | 14 | 16 | 14 | 14 | 14 |
| | L1/L | 0.63 | 0.71 | 0.71 | 0.63 | 0.71 | 0.63 | 0.61 | 0,43 | 0.43 |
| Cross-Sectional Area | S1 | 6.60 | 6.60 | 6.60 | 6.60 | 6.60 | 6.60 | 6.60 | 6.60 | 3.80 |
| | S2 | 2.54 | 1.67 | 3.14 | 2.54 | 1.67 | 1.67 | 1.67 | 1.67 | 1.67 |
| | S2/S1 | 0.39 | 0.25 | 0.48 | 0.39 | 0.25 | 0.25 | 0.25 | 0.25 | 0.44 |
| Guide | | a | b | c | d | e | b | b | b | b |
| Amount of Cosmetic Liquid Discharged | B/A | 0.82 | 0.88 | 0.55 | 0.31 | 0.24 | 0.81 | 0.63 | 0.48 | 0.43 |
| Evaluation Result | | A | A | B | C | C | A | B | C | C |

The formulation of the cosmetic used is as follows.

Humectant: 1.3-butylene glycol 8.0%
Preservative 1.2%
pH adjusting agent: 5% citric acid 0.4%
Fixing agent: YODOSOL GH800F 17.2%
Colored resin particles: LR-226-25 15.0%
Glitter particles: Crystal SL (available from Toyo Aluminum K. K.) average particle size 20 μm 1.0%
Glitter particles: Frost SL (available from Toyo Aluminum K. K.) surface-treated with crystalline cellulose [(Ceolus RC-591 (available from Asahi Kasei Corporation)] by spray drying, average particle size 64 μm 4.0%
Purified water Remainder The "average particle size" defined in the present invention is the D50 value calculated on a volume basis using a particle size distribution analyzer HRA9320-X100 (available from Nikkiso Co., Ltd.).

The viscosity of the cosmetic used is 4.0 mPa·s.

In all of the comparative examples, application shortage occurred before the distance reached 30 (m) (evaluated as C). In examples 1 to 4, application reached 30 (m) and the result was good (evaluated as A).

FIG. 6 presents the types of guides used in the above evaluation. The specifications are as follows.

Guide a: molded core with an outer diameter φ of 1.8 (mm) and a capillary force of 94 (mm), Guide b: molded core with an outer diameter φ of 1.5 (mm) and a capillary force of 113 (mm), Guide c: fiber bundle core with an outer diameter φ of 2.0 (mm), a capillary force of 199 (mm), and a porosity of 61%, $$\text{Porosity (unit: \%)} = (\text{Volume of Purified Water})/(\text{Apparent Volume of Guide}) \times 100$$

The above-described embodiment is an example of the present invention, and it goes without saying that modifications made within the scope of the present invention are also within the technical scope.

INDUSTRIAL APPLICABILITY

The applicator according to the present disclosure can be used as an applicator for an application liquid.

REFERENCE SIGNS LIST

10 Front Barrel
**10*f*** Front End Opening
**10*f*1** Front End Surface Portion
12 Outer Barrel
14 Cosmetic Accommodation Portion
16 Collector
18 Brush
**18*a*** Flange
**18*b*** Space (Internal Space)
22 Guide
**22*a*** Front End Portion of Guide

22*b* Communication Hole of Guide
100 Barrel

The invention claimed is:

1. A cosmetic applicator comprising:

a barrel;

a brush made of bundled fibers and provided in front of the barrel;

a cosmetic accommodation portion arranged in a space within the barrel;

a guide configured to guide a cosmetic from the cosmetic accommodation portion to the brush;

a collector that has a comb-shaped outer circumferential surface and that is disposed inside the barrel and at an outer circumferential portion of the guide; and the barrel supporting the brush at a front portion of the barrel, a capillary force of the guide being 50 to 200 (mm) (as measured using purified water in an environment of 25° C.), and (B)/(A) being 0.8 or greater, where (A) (mg) is an amount of cosmetic liquid discharged for 1 (m), and (B) (mg) is an amount of cosmetic liquid discharged for 1 (m) after 30 (m).

2. The cosmetic applicator according to claim 1, wherein a maximum diameter of the brush excluding a flange portion is 2.5 to 4 (mm), a ratio of a length (L1) of the brush protruding from the barrel toward a front direction to a total length (L) of the brush, or L1/L, is 0.6 to 0.9, and the total length (L) of the brush is 15 (mm) or less.

3. The cosmetic applicator according to claim 1, wherein a front end surface of the guide is positioned in front of a front end surface of the barrel, and a cross-sectional area of a space inside the brush is 15(%) or greater of a cross-sectional area of the brush.

4. The cosmetic applicator according to claim 1, wherein the cosmetic applicator is adapted for a cosmetic, and the cosmetic comprises at least glitter particles having a long axis length of 10 to 30 (μm), glitter particles having a long axis length of 50 to 80 (μm), and water.

* * * * *